United States Patent
Anders et al.

(10) Patent No.: US 10,902,029 B2
(45) Date of Patent: Jan. 26, 2021

(54) HASHTAG GENERATION USING CORPUS-BASED APPROACH

(71) Applicant: International Business Machines Corporation, Armonk, NY (US)

(72) Inventors: Kelley Anders, East New Market, MD (US); Jonathan Dunne, Dungarvan (IE); Shadi Albouyeh, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 16/103,281

(22) Filed: Aug. 14, 2018

(65) Prior Publication Data
US 2020/0057820 A1 Feb. 20, 2020

(51) Int. Cl.
G06F 40/30 (2020.01)
G06N 5/02 (2006.01)
G06N 99/00 (2019.01)
G06F 16/28 (2019.01)
G06F 16/22 (2019.01)
G06F 16/9535 (2019.01)

(52) U.S. Cl.
CPC ........ *G06F 16/285* (2019.01); *G06F 16/2282* (2019.01); *G06F 16/9535* (2019.01); *G06F 40/30* (2020.01)

(58) Field of Classification Search
CPC ..................................................... G06F 16/48
See application file for complete search history.

(56) References Cited

U.S. PATENT DOCUMENTS

| 9,292,877 B2 | 3/2016 | Blanchflower et al. |
| 9,646,263 B2 | 5/2017 | Pasternack |
| 2016/0253715 A1 | 9/2016 | Xie et al. |
| 2016/0269344 A1 | 9/2016 | Anders et al. |
| 2016/0328401 A1 | 11/2016 | Dhawan et al. |

(Continued)

OTHER PUBLICATIONS

Anonymous, "System and Method for Recommending Social Media Hashtags." IP.com Disclosure No. IPCOM000222352D, Publication Date: Sep. 26, 2012.,4pages.

(Continued)

*Primary Examiner* — Shreyans A Patel
(74) *Attorney, Agent, or Firm* — Schmeiser, Olsen & Watts, LLP; Michael O'Keefe

(57) ABSTRACT

A system and method for generating dynamic, non-subjective hashtags using a corpus-based approach includes capturing social media outputs from a user and from cohorts of the user to create a user corpora and a user cohort corpora, respectively, storing the user corpora and the user cohort corpora in a computer readable storage device coupled to the computing system, deriving a hashtag collation model by analyzing the user corpora and the user cohort corpora, the hashtag collation model being stored on the computer readable storage device, generating a best matched hashtag using the hashtag collation model, wherein the hashtag collation model infers the optimal hashtag from the user corpora and user cohort corpora based on a usage of one or more terms within the user corpora and the user cohort corpora, and adjusting the best matched hashtag over time as the user corpora and the user cohort corpora change over time.

17 Claims, 8 Drawing Sheets

(56) References Cited

U.S. PATENT DOCUMENTS

2017/0052954 A1* 2/2017 State .................. G06F 16/48
2017/0193126 A1 7/2017 Albouyeh et al.

OTHER PUBLICATIONS

R. Zhang, "Method and System for Creating a Dynamic Hashtag." IP.com Disclosure No. IPCOM000233545D, Publication Date: Dec. 12, 2013., 3 pages.

* cited by examiner

HASHTAG GENERATION USING CORPUS-BASED APPROACH

TECHNICAL FIELD

The present invention relates to systems and methods for generating corpora crowdsourced hashtags, and more specifically the embodiments of a hashtag generation system for generating dynamic and non-subjective hashtags using a corpus-based approach.

BACKGROUND

Hashtags are widely used within social media platforms. Hashtags appeal highlight a piece of information about a text corpora that an author or commentator may find useful. One of the aims of a user's hashtag is that the information contained within can be used as a way to trend a particular media artifact or can be used as a social trope or as a meme. Conventional hashtags are static and subjective to the author.

SUMMARY

An embodiment of the present invention relates to a method, and associated computer system and computer program product, for generating dynamic and non-subjective hashtags using a corpus-based approach. A processor of a computing system captures social media outputs from a user and from cohorts of the user to create a user corpora and a user cohort corpora, respectively. The user corpora and the user cohort corpora is stored in a computer readable storage device coupled to the computing system. A hashtag collation model is derived by analyzing the user corpora and the user cohort corpora stored on the computer readable storage device, the hashtag collation model being stored on the computer readable storage device. An optimal hashtag is generated using the hashtag collation model, wherein the hashtag collation model infers the optimal hashtag from the user corpora and user cohort corpora based on a usage of one or more terms within the user corpora and the user cohort corpora. The optimal hashtag is adjusted over time as the user corpora and the user cohort corpora change over time

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
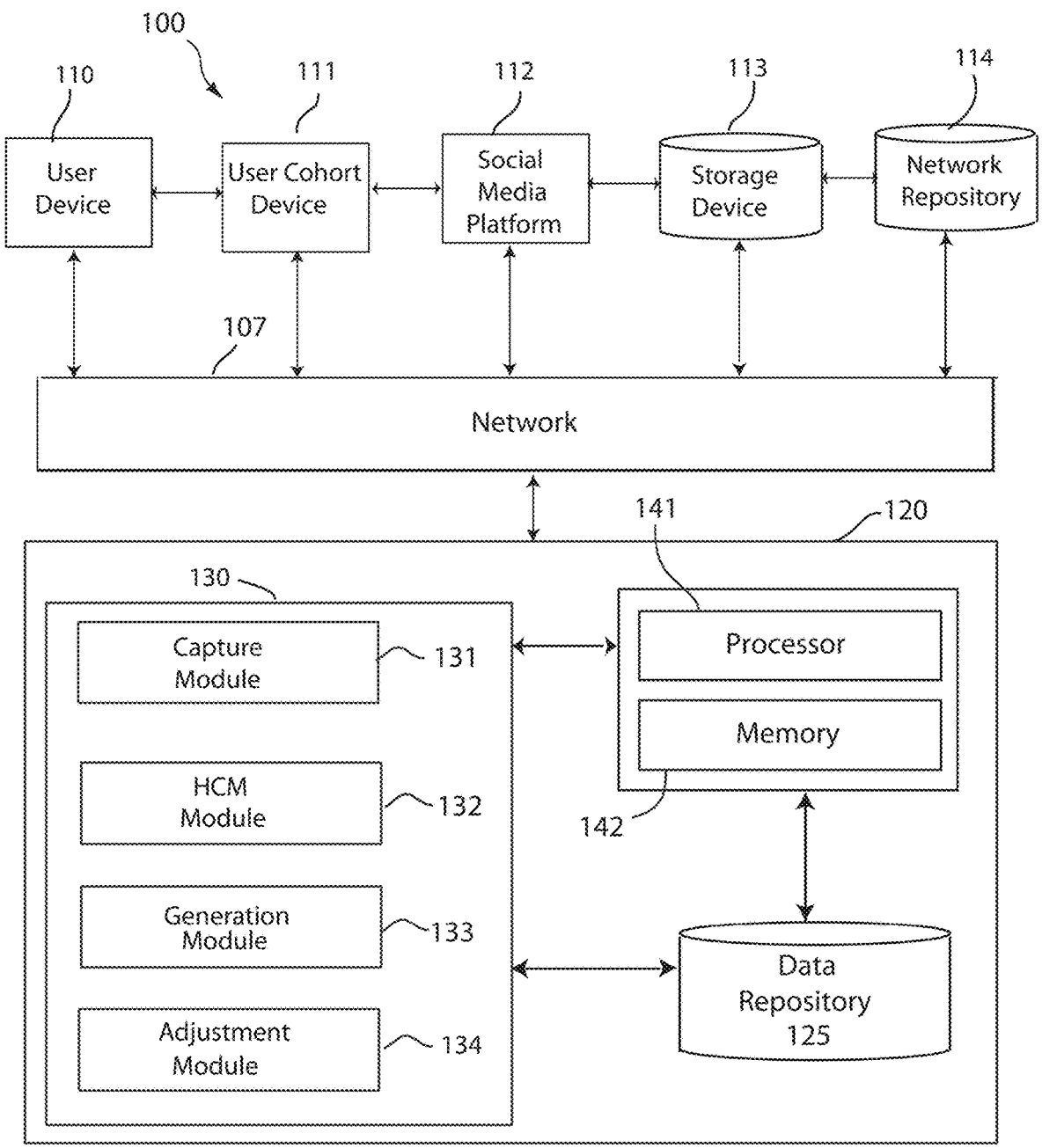
FIG. 1 depicts a block diagram of a hashtag generation system, in accordance with embodiments of the present invention.

Referring to the drawings, FIG. 1 depicts a block diagram of a hashtag generation system 100, in accordance with embodiments of the present invention. Embodiments of the hashtag generation system 100 may be a system for generating dynamic and non-subjective hashtags using a corpus-based approach. The hashtag generation system 100 generates hashtags to eliminate the immutability and subjectivity of conventional hashtags. For example, the hashtag generation system 100 may derive a hashtag collation model (HCM) that generates optimal non-subjective hashtags that maintain a relevancy to a social user (and corpora) over time. In other words, the hashtag generation system 100 provides a user with a corpora crowdsourced-based hashtag using corpora linguistic analysis.

Embodiments of the hashtag generation system 100 may be an optimal hashtag generator system, a crowdsourced hashtag generation system, a corpora-based hashtag generation system and the like. The hashtag generation system 100 includes a computing system 120. Embodiments of the computing system 120 may be a computer system, a computer, a server, one or more servers, a backend computing system, and the like.

Furthermore, the hashtag generation system 100 includes a user device 110, a user cohort device 111, a social media platform 112, and a storage device 113, which are communicatively coupled to the computing system 120 over a network 107. For instance, information/data is transmitted to and/or received from the user device 110, the user cohort device 111, the social media platform 112, and the storage device 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information relating to used hashtags, user profiles, user cohort profiles, social media activity, etc., network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging, user social media activity, user social media profiles, generated hashtags, hashtag activity, and the like, to generate both historical and predictive reports regarding a particular user or a particular hashtag, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the user device 110 may be a computing device, a computer, a desktop computer, a cell phone, a mobile computing device, a tablet computer, a laptop computer, a wearable computing device, a smartwatch, an augmented reality device, and the like, which may be used to interact with social media websites and channels to post content on the social media platform 112. The user device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. Similarly, the user cohort device 111 is also a may be a computing device, a computer, a desktop computer, a cell phone, a mobile computing device, a tablet computer, a laptop computer, a wearable computing device, a smartwatch, an augmented reality device, and the like, which may be used to interact with social media websites and channels to post content on the social media platform 112. The user cohort device 11 may include the same hardware functionality as the user device 110

Referring still to FIG. 1, embodiments of the hashtag generation system 100 may include a social media platform system 112. The social media platform 112 is communicatively coupled to the computing system 120 over network 107. Embodiments of the social media platform 112 may be a network, a computing system, a network of computers, a plurality of computers, databases, networks, one or more databases, storage devices, repositories, servers, computers, engines, and the like, that may service, run, store or otherwise contain information and/or data regarding a social media network of a user and the user's social contacts and cohorts. The social media platform 112 is accessed or may share a communication link over network 107, and can be managed and/or controlled by a third party, such as a social media company. In an exemplary embodiment, the social media platform 112 is a social media network, social media website, social media channel, social media mobile application, a social media engine, and the like, which stores or otherwise contains content posted by the user and the cohorts of the user.

Embodiments of the digital promotion system 100 include one or more storage devices 113. The storage device is a computer readable storage device communicatively coupled to the computing system 120. In one embodiment, the storage device 113 is coupled to the computing system 120, as shown in FIG. 1. In another embodiment, the storage device 113 is local to the computing system 120. Embodiments of the storage device 113 may be a database or physical server system that stores corpora data, user and user cohort profiles, hashtag key terms, and the like.

Furthermore, the computing system 120 of the hashtag generation system 100 is equipped with a memory device 142 which stores various data/information/code, and a processor 141 for implementing the tasks associated with the hashtag generation system 100. A hashtag generator application 130 is loaded in the memory device 142 of the computing system 120. The hashtag generator application 130 may be an interface, an application, a program, a module, or a combination of modules. In an exemplary embodiment, the hashtag generator application 130 is a software application running on one or more back end servers, servicing one or more user devices 110 and user cohort devices 111, wherein a user interface portion of the software application (e.g. a social media platform software application) may also run on the user device 110 and the user cohort device 111.

The hashtag generator application 130 of the computing system 120 includes a capture module 131, a HCM module 132, a generation module 133, and an adjustment module 134. A "module" refers to a hardware-based module, software-based module or a module that is a combination of hardware and software. Embodiments of hardware-based modules include self-contained components such as chipsets, specialized circuitry and one or more memory devices, while a software-based module is part of a program code or linked to the program code containing specific programmed instructions, which is loaded in the memory device of the computing system 120. A module (whether hardware, software, or a combination thereof) is designed to implement or execute one or more particular functions or routines.

Figure 2:
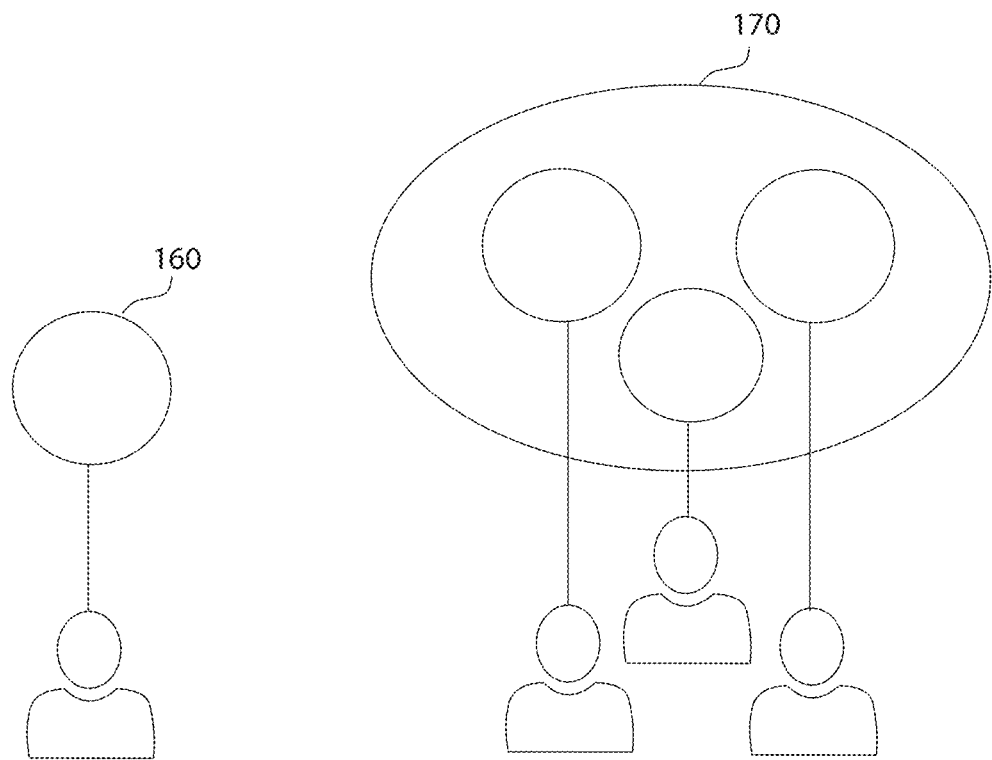
FIG. 2 depicts a schematic diagram showing a user's social media outputs being captured and the user's cohorts' social media outputs being captured, in accordance with embodiments of the present invention.

Embodiments of the detection module 131 include one or more components of hardware and/or software program code for capturing social media outputs from a user and from cohorts of the user to create a user corpora and a user cohort corpora, respectively. FIG. 2 is a schematic diagram showing a user's social media outputs being captured and the user's cohorts' social media outputs being captured, in accordance with embodiments of the present invention. The capture module 131 monitors an individual users' social media outputs posted on the social media platform 112. The social media outputs include posts, replies, article submissions, blogs, comments, tweets, pictures, videos, etc. Some of the user's social media outputs are accompanied by a conventional hashtag having one or more terms selected by the user. The selection of the terms for the conventional hashtags are subjective to the user; the user selects the words for the conventional hashtag from the perspective of the user only, and how the social media output is understood by the user. Similarly, the capture module 131 monitors each individual user cohort's social media outputs posted on the social media platform 112. The social media outputs include posts, replies, article submissions, blogs, comments, tweets, pictures, videos, etc. Some of the user cohort's social media outputs are accompanied by a conventional hashtag having one or more terms selected by the user cohort. The selection of the terms for the conventional hashtags are subjective to the user cohort; the user cohort selects the words for the conventional hashtag from the perspective of the user cohort only, and how the social media output is understood by the user cohort.

The user and the user cohorts are connected in some manner. For example, the user and the user cohorts may be: attending the same event, located in the same geographical location, members of the same social media group, social media "friends", employed by the same employer, fans of the same team, enrolled at the same schooling institution, colleagues, using the same social media platform, and the like. The capture module 131 optionally restricts a number of the user cohorts of the user by applying a filter to the social media outputs of the cohorts of the user. In an exemplary embodiment, the capture module 131 applies a geofence filter such that only social media outputs from cohorts of the user within the geofence are used to create the user cohort corpora. By way of an example, a user is attending a sporting event and is sitting in the north side end zone of a stadium, and a geofence filter is activated on the user device. Only the social media outputs from the user and the user cohorts sitting in sections proximate the north side end zone of the stadium are captured to create the corpora. The filter could also be based on an experience level of the user cohorts number of years employed), a social media activity (e.g. posts per month), a demographic (e.g. age/ gender), topic, and then like. By applying the filter, the processing required of the computing system 120 is reduced and the overall data of the corpora is reduced because the number of social media outputs to be analyzed is reduced. In addition, the relevancy of the social media outputs of the user cohorts and the user is increased by applying the filter, leading to more accurate hashtag generation, as described in greater detail infra.

The captured user social media outputs are aggregated by the capture module 131 to create a user corpora 160. The user corpora 160 is a body or collection of social media artifacts shared by the user, as captured by the capture module 131. The user corpora 160 includes text, hashtags, posts, content, etc. across one or more social media platforms 112, regarding a plurality of topics, shared by the user accompanied by a subjective hashtag chosen by the user. Similarly, the social media outputs of the user cohorts are aggregated by the capture module 131 to create a user cohort corpora 170. The user cohort corpora 170 is a body or collection of social media artifacts shared by a plurality of user cohorts, as captured by the capture module 131. The user cohort corpora 170 includes text, hashtags, posts, content, etc. across one or more social media platforms 112, regarding a plurality of topics, shared by the plurality of user cohorts accompanied by subjective hashtags chosen by the user cohorts.

Moreover, the user corpora 160 and the user cohort corpora 170 is stored in a computer readable storage device 113 coupled to the computing system 120. In one embodiment, the computer readable storage device 113 is a server system that stores the user corpora 160 and the user cohort corpora 170 within a session state of the server system to increase a processing speed from the server system while using less memory. In another embodiment, the computer readable storage device 113 is a database that stores optimal hashtags and adjusted hashtags, wherein the timestamps of the optimal hashtag and the adjusted hashtags are mapped to a database table of the database to decrease retrieval times when retrieving data from the database. In an exemplary embodiment, the hashtag generation system 100 includes both the server system and a database, communicatively coupled to the computing system 120.

Referring back to FIG. 1, the computing system 120 includes HCM module 132. The HCM module 132 includes one or more components of hardware and/or software program code for deriving the hashtag collation model (HCM), which is stored on the computer readable storage device 113. The HCM is derived by analyzing the user corpora and the user cohort corpora stored on the computer readable storage device 113. The user corpora and the user cohort corpora are analyzed using a corpora linguistic analysis to collate and colligate data within the user corpora and the user cohort corpora. The corpora linguistic analysis is implemented by a corpus analysis tool such as a software application that searches the user corpora and the user cohort corpora for patterns, frequency information, collocations, etc., and applies a quantitative analysis to the detected patterns, frequency information, collocations, etc. An example of a corpus analysis software application is CQPweb.

Using the corpus analysis tool, collations and colligations and other frequency information are analyzed to determine a usage of the most common terms for a particular topic or event within the user corpora and the user cohort corpora. Over time, the HCM module 132 infers what collations are mapped to a specific event or topic. The topics or specific events are determined by analyzing a content of the social media outputs within the user corpora and the user cohort. For instance, the HCM module 132 analyzes, reviews, scans, parses, examines, etc. the content of the social media outputs to determine the topics of the content of the social media outputs. Moreover, the HCM module 132 first determines a type of content of the social media outputs. For example, the HCM module 132 determines whether the content of the social media outputs is text, a photograph, a video, a location check-in, a digital file, and the like. The type of content determines which type of analyzation technique is used to determine the content of the content of the social media outputs. If the type of content of the social media outputs is text, the HCM module 132 uses at least one a natural language processing technique, a sentiment analyzer, a topic analyzer, an insight engine, and the like. If the type of content of the social media outputs is a photograph or a video, the HCM module 132 uses an image recognition engine, a visual insights engine, and the like. If the type of content of the social media outputs is a location check-in or a reference to a particular point of interest, the geographic coordinates of the location check-in or the point of interest can be cross-referenced with known points of interest.

Further, as a result of the text analysis and image recognition engine techniques to determine the topic of the content of the social media outputs, the HCM module 132 extracts one or more keywords that define or otherwise correspond to the topic of the content of the social media outputs. For example, the HCM module 132 analyzes, parses, or otherwise processes the results of the text analysis and the visual recognition engine to extract one or more keywords. The HCM is thus derived using results from the corpora linguistic analysis using the corpus analysis tool and optionally the text analysis engine and the visual recognition engine.

Referring still to FIG. 1 the computing system 120 includes a generation module 133. The generation module 133 includes one or more components of hardware and/or software program code for generating an optimal hashtag using the HCM. To generate the optimal hashtag for a given collection of media artifacts shared on the social media platform 112, the HCM infers the optimal hashtag from the user corpora and user cohort corpora based on a usage of one or more terms relevant to the collection of media artifacts within the user corpora and the user cohort corpora. For example, the HCM infers the optimal hashtag that will have the most resonance due to a widest usage non terms) in the user corpora and the user cohort corpora for the collection of media artifacts. The optimal hashtag generated by the HCM eliminates the subjectivity of the conventional hashtag because the HCM considers the user corpora and the user cohorts corpora to determine the most suitable terms for creating a hashtag associated with the collection of media artifacts posted on the social media platform 112. The MCM module 133 may replace the original conventional hashtag submitted by the user with the optimal hashtag generated by the HCM so that the optimal hashtag is displayed on the social media platform 112.

The computer system 120 also includes an adjustment module 134. The adjustment module 134 includes one or more components of hardware and/or software program code for adjusting the optimal hashtag over time as the user corpora and the user cohort corpora change over time. For example, the adjustment module 134 adjusts the optimal hashtag so that the optimal hashtag associated with a collection of media artifacts across the social media platform 112 stays relevant by incorporating newly trending terms from the user corpora and user cohort corpora. As new social media outputs are collected from additional user cohorts and/or the user and the initially contributing user cohorts continue to post content with the generated optimal hashtag, the HCM is updated and utilized to infer a new optimal hashtag. Overt time, the adjustment module 134 replaces the current optimal hashtag with new optimal hashtags generated by the HCM based on changes to the user corpora and the user cohort corpora. Accordingly, the displayed hashtag (i.e. current optimal hashtag) evolves over time to maintain a degree of relevancy to the collection of media artifacts as additional content is posted using the current optimal hashtag.

As a function of adjusting the optimal hashtag to account for changes to the user corpora and the user cohort corpora, the adjustment module 134 distinguishes static terms of the optimal hashtag from dynamic terms of the optimal hashtag. The static terms of the optimal hashtag remain locked over time, while the dynamic terms of the optimal hashtag are adjusted over time. By way of an example, an initial optimal hashtag of "Green Team Winning" for a collection of social media artifacts referring to a sporting team playing in a playoff game, the word "Winning" is dynamic because when the playoff game ends the word "Winning" can be changed to "Won". The initial hashtag "Green Team Winning" is adjusted after the outcome of the game to "Green Team Won" so that the optimal hashtag associated with social media outputs referring to the Green Team winning the playoff game stays relevant over time. In this example, "Green Team" is a static word that is locked so that the words "Green Team" remain in each iteration of the optimal hashtag. The static nature can be set by the user or administrator of the computing system 120.

Furthermore, the adjustment module 134 can control a sentiment of the optimal hashtag by filtering out social media outputs from the user corpora and the user cohort corpora that do not match a preferred sentiment. For instance, the adjustment module 134 optionally associates a preferred sentiment with the optimal hashtag and continues so that future adjustments of the optimal hashtag do not violate the associated sentiment of the original optimal hashtag. By controlling the sentiment of the optimal hashtag, misappropriation of the optimal hashtag for negative or unexpected reasons. The adjustment module 134 analyzes the user corpora and the user cohort data to determine a sentiment of content that relates to the optimal hashtag. Content that is determined to have a sentiment that does not correspond to the preferred sentiment associated with the optimal hashtag is deleted, flagged, or otherwise not considered by the HCM when generating the new optimal hashtag for adjusting a current optimal hashtag.

Various tasks and specific functions of the modules of the computing system 120 may be performed by additional modules, or may be combined into other module (reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the hashtag generation system 100 change an appearance of a GUI using hashtag generator application 130. The hashtag generation system 100 transforms a GUI on a mobile device or other computing device as the hashtags are adjusted over time. For instance, with the hashtag generator system 100, a GUI is augmented by appending relevant and non-subjective hashtags to social media content posted to the social media platform 112 such that the social media channel is altered.

Furthermore, the hashtag generation system 100 improves hashtag generation techniques. Without using the hashtag generation system 100, static and subjective hashtags remain unchanged across social media platforms, and eventually lose relevance over time. The hashtag generation system 100 provides a technical solution to the above-drawbacks by altering or otherwise augmenting the hashtags displayed on a social media channel. The technical solution(s) described herein is necessarily rooted in computer technology in order to overcome a problem specifically arising in the realm of dynamic generating and updating hashtags across social media platforms using the HCM. Further, the HCM can be stored within a server system, and the output from the HCM can be stored within a session state, allowing for a smaller memory footprint. The real-world effect is by providing for faster multiple concurrent processing of required content from the server side with less memory. In other words, the HCM stored in the session state allows for faster inference of an optimal hashtag, which improves the speed of which the optimal hashtag can be generated and ultimately displayed on the social media channel.

Figure 3:
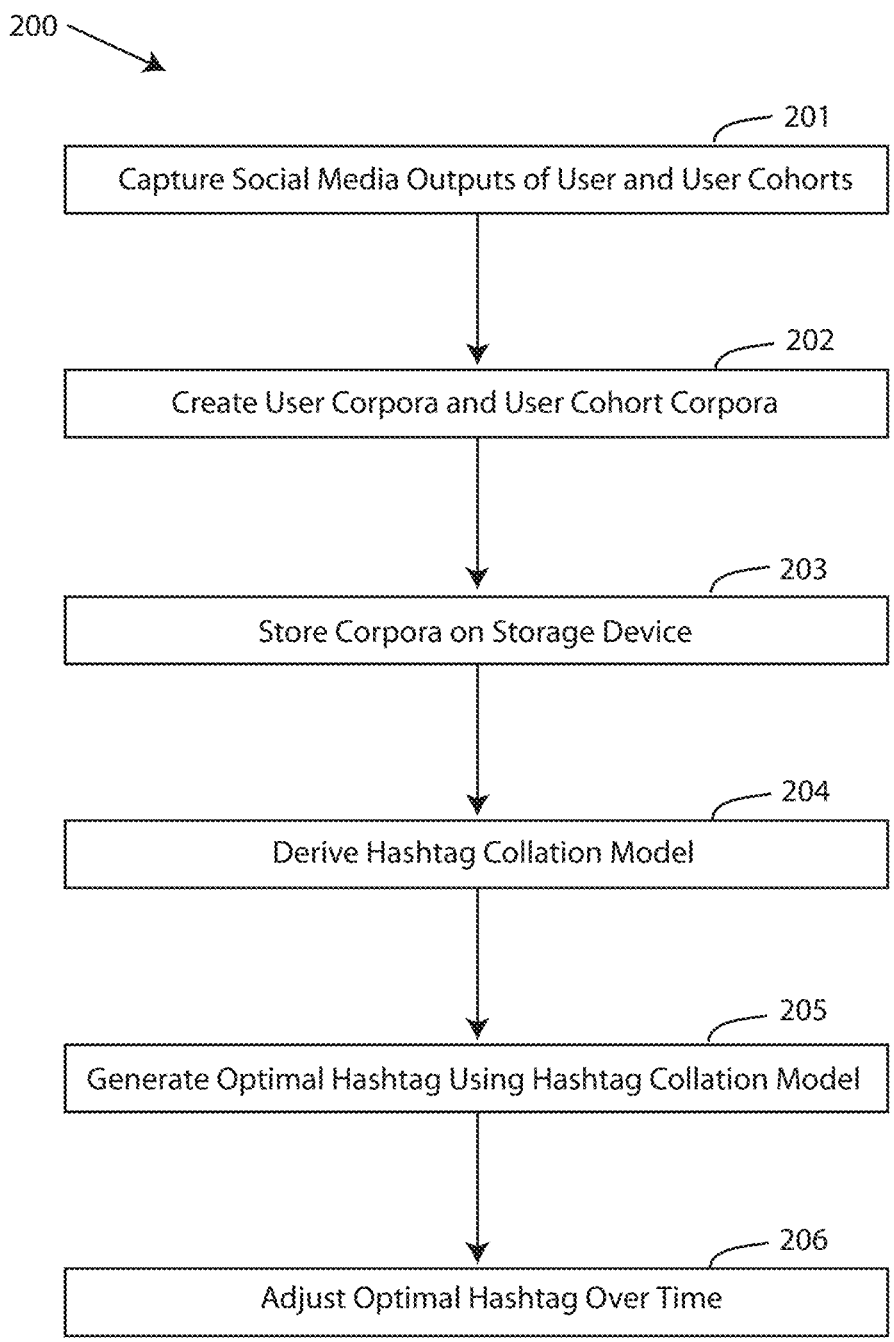
FIG. 3 depicts a flow chart of a method for generating dynamic and non-subjective hashtags using a corpus-based approach, in accordance with embodiments of the present invention.

Referring now to FIG. 3, which depicts a flow chart of a method 200 for generating dynamic and non-subjective hashtags using a corpus-based approach, in accordance with embodiments of the present invention. One embodiment of a method 200 or algorithm that may be implemented for generating dynamic and non-subjective hashtags using a corpus-based approach with the hashtag generation system 100 described in FIGS. 1-2 using one or more computer systems as defined generically in FIG. 6 below, and more specifically by the specific embodiments of FIG. 1.

Embodiments of the method 200 for generating dynamic and non-subjective hashtags using a corpus-based approach, in accordance with embodiments of the present invention, may begin at step 201 wherein social media outputs of the user and social media outputs of the user cohorts are captured. Step 202 creates the user corpora and the user cohort corpora from the captured social media outputs. Step 203 stores the user corpora and the user cohort corpora on a storage device. Step 204 derives the HCM. Step 205 generates an optimal hashtag using the HCM. Step 206 adjusts the optimal hashtag over time.

Figure 4:
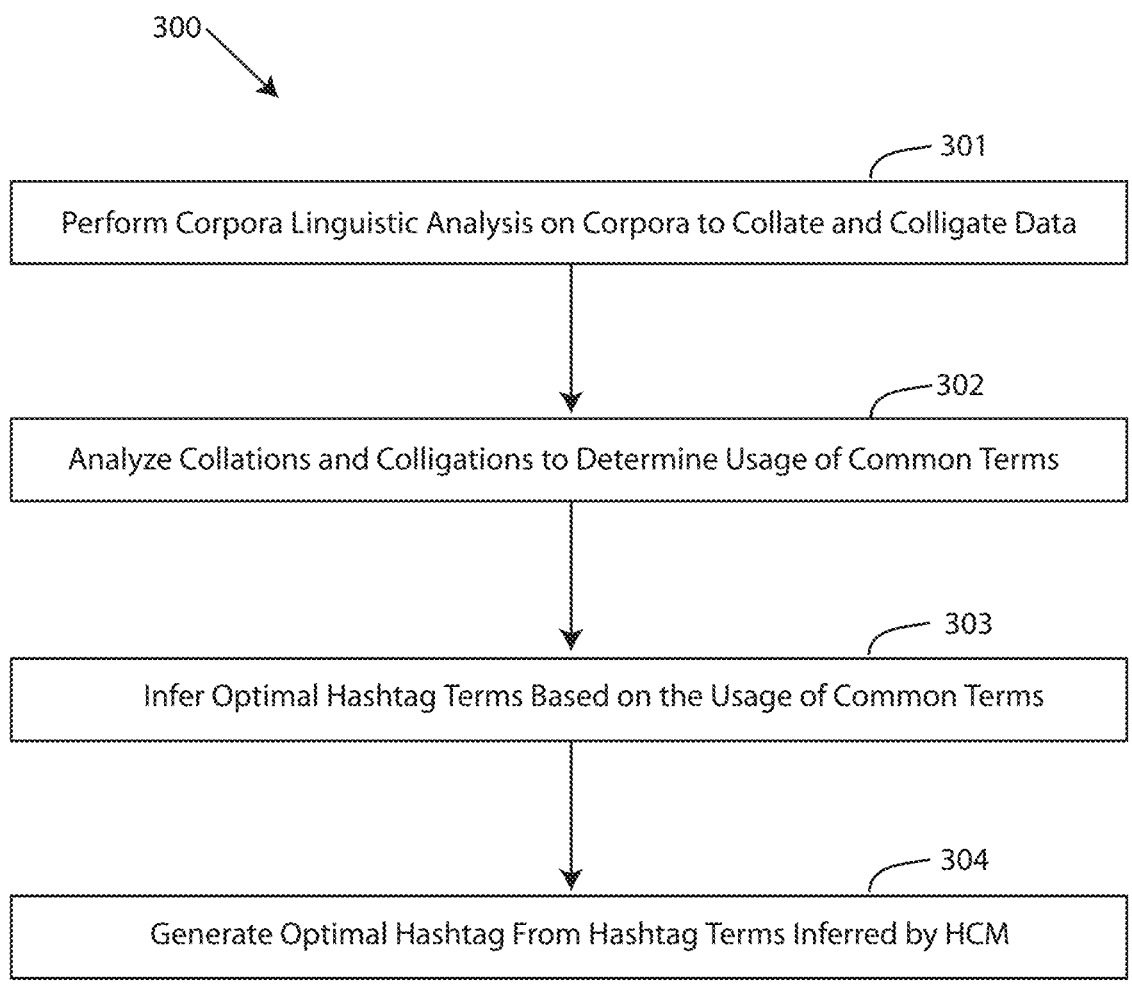
FIG. 4 depicts a flow chart of a method for deriving and using the hashtag collation model to generate optimal hashtags, in accordance with embodiments of the present invention.

FIG. 4 depicts a flow chart of a method 300 for deriving and using the HCM, in accordance with embodiments of the present invention. Step 301 performs a corpora linguistic analysis on the user corpora and the user cohort corpora to collate and colligate data within the user corpora and the user cohort corpora. Step 302 analyzes the collations and colligations to determine a usage of the common terms and/or most used terms. Step 303 infers the optimal hashtag based on the usage of the common terms and/or the most used terms. Step 304 generates the optimal hashtag from hashtag terms inferred by the HCM.

Figure 5:
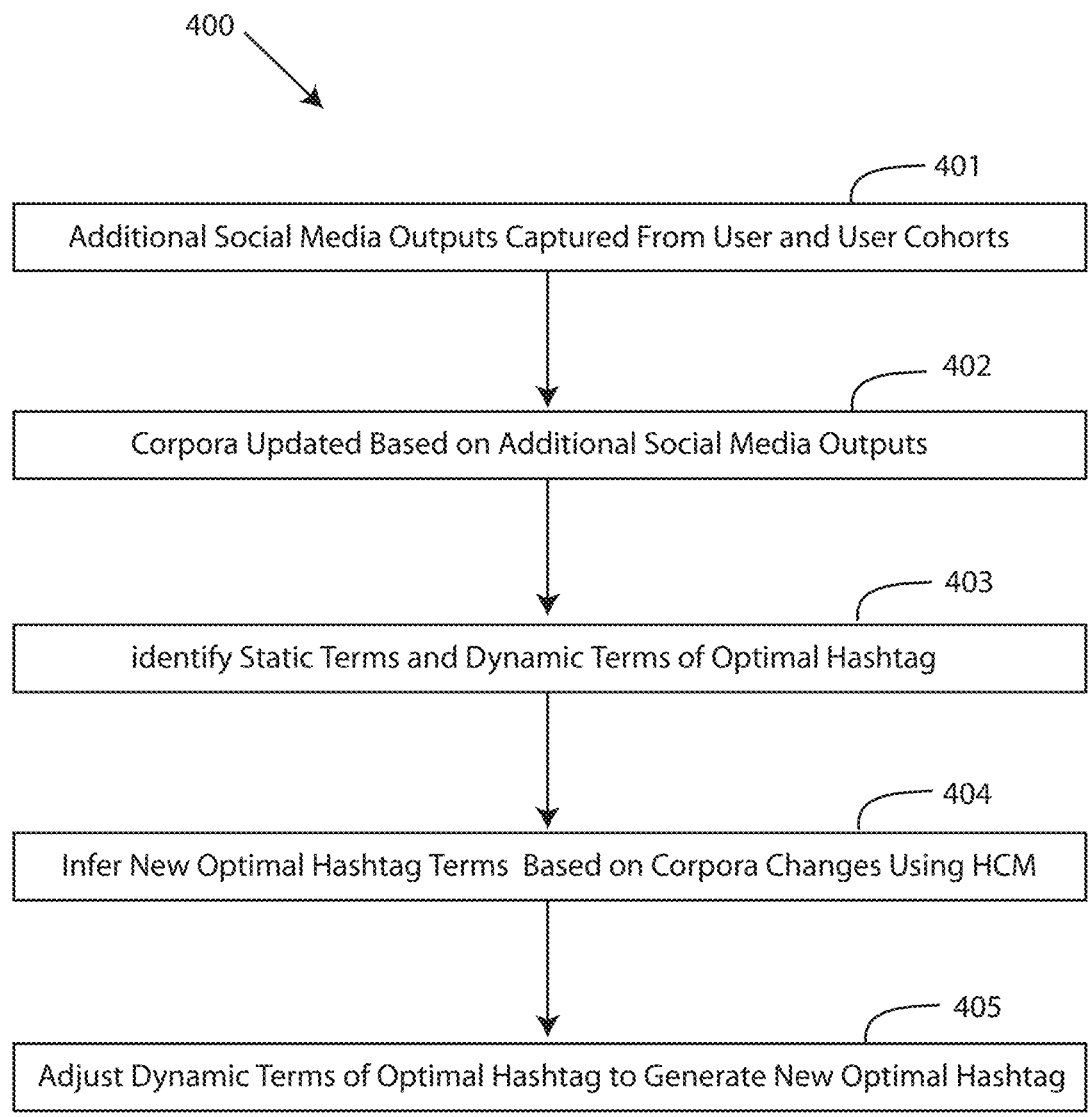
FIG. 5 depicts a flow chart of a method for adjusting an optimal hashtag, in accordance with embodiments of the present invention.

FIG. 5 depicts a flow chart of a method 400 for adjusting an optimal hashtag, in accordance with embodiments of the present invention. Step 401 captures additional social media outputs from the user and the user cohorts. Step 402 updates the user corpora and the user cohort corpora stored on the storage device. Step 403 identifies static terms and dynamic terms of a current optimal hashtag. Step 404 infers new hashtag terms based on changes to the user corpora and the user cohort corpora using the HCM. Step 405 adjusts the dynamic terms of the current optimal hashtag to generate a new optimal hashtag to adjust or replace the current hashtag.

Figure 6:
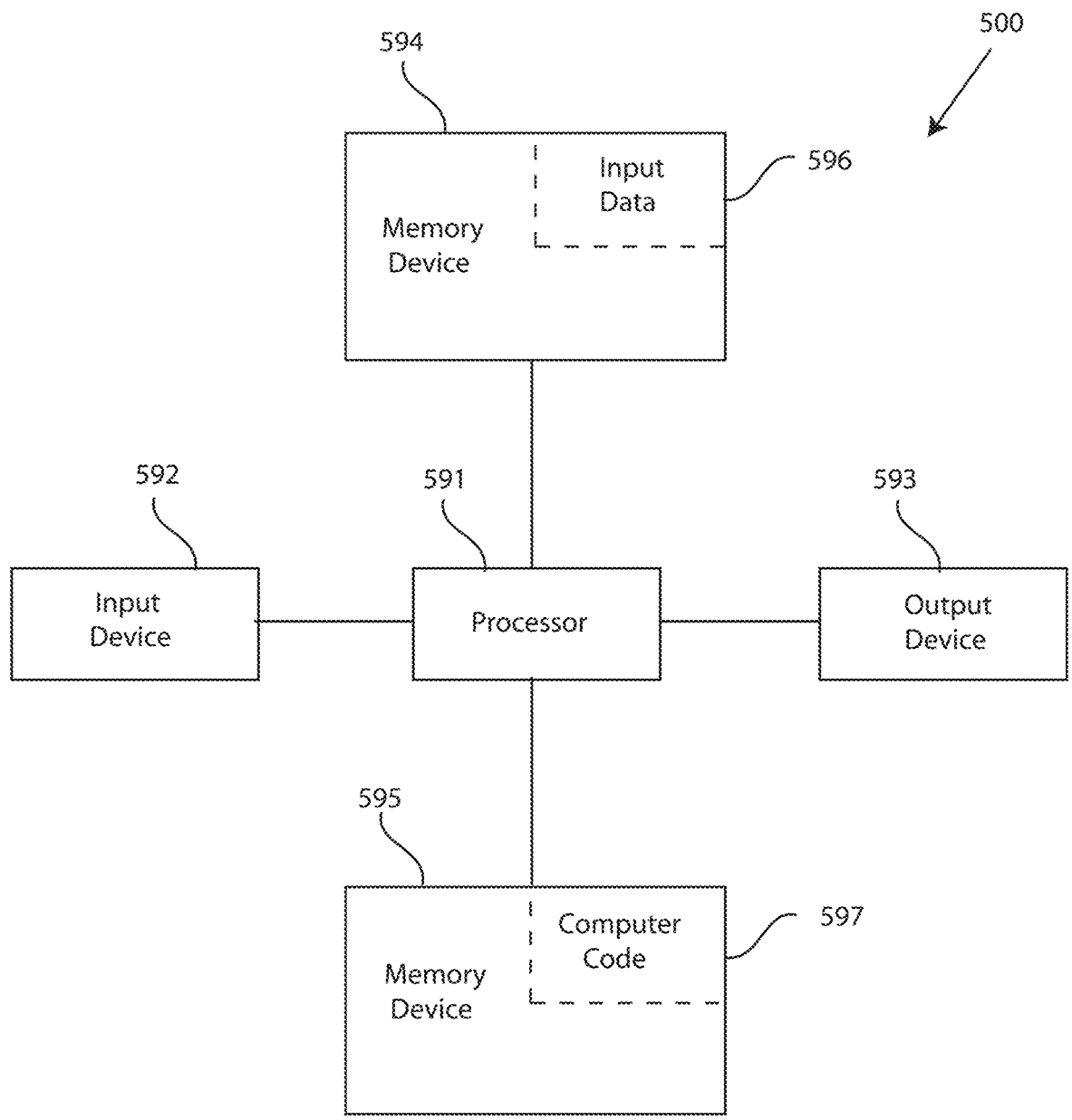
FIG. 6 depicts a block diagram of a computer system for the hashtag generation system of FIGS. 1-2, capable of implementing methods for generating dynamic and non-subjective hashtags using a corpus-based approach of FIGS. 3-5, in accordance with embodiments of the present invention.

FIG. 6 depicts a block diagram of a computer system for the hashtag generation system of FIGS. 1-2, capable of implementing methods for generating dynamic and non-subjective hashtags using a corpus-based approach of FIGS. 3-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for generating dynamic and non-subjective hashtags using a corpus-based approach in the manner prescribed by the embodiments of FIGS. 3-5 using the hashtag generation system 100 of FIGS. 1-2, wherein instructions of the computer code 597 may be executed by processor 591 via memory device 595. The computer code 597 may include software or program instructions that may implement one or more algorithms for implementing the method for generating dynamic and non-subjective hashtags using a corpus-based approach, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/Output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to dynamic and non-subjective hashtags generation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to generate dynamic and non-subjective hashtags using a corpus-based approach. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for generating dynamic and non-subjective hashtags using a corpus-based approach. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for generating dynamic and non-subjective hashtags using a corpus-based approach.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (Iaas): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
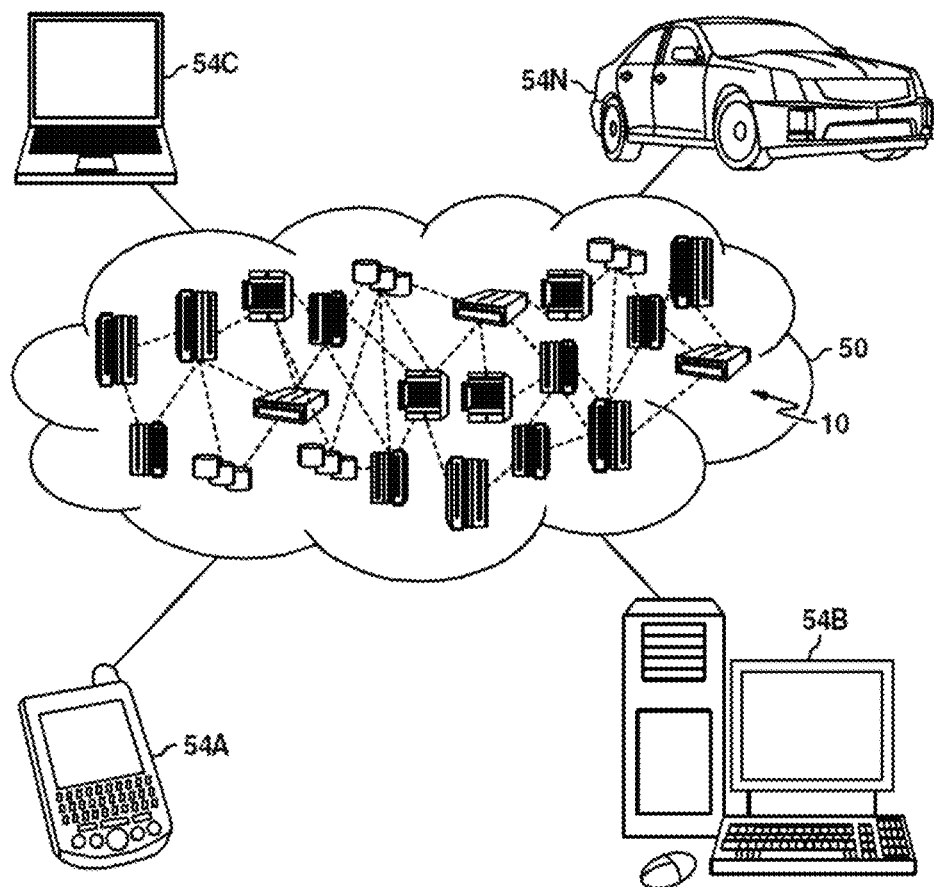
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
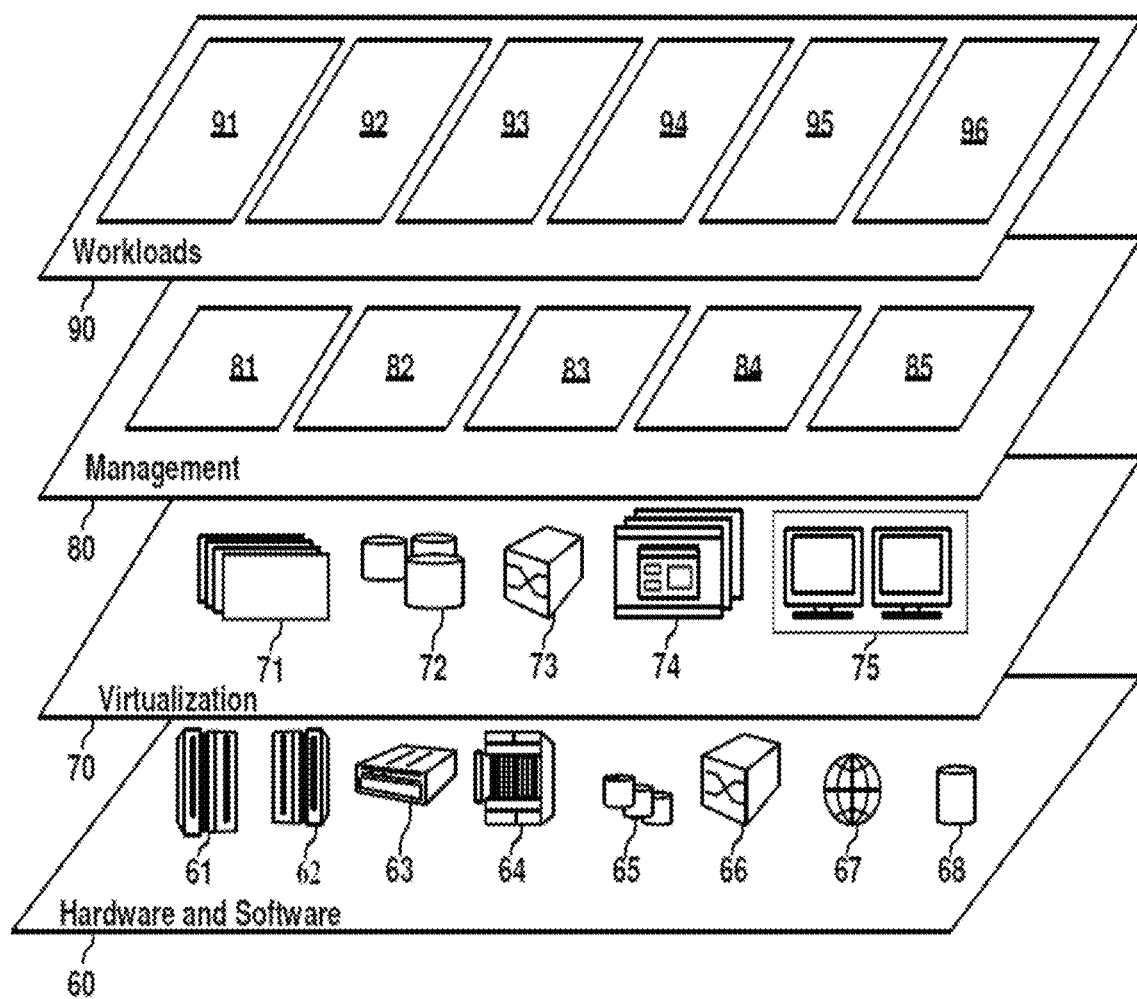
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from hick the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and hashtag generation and adjustment 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating dynamic and non-subjective hashtags using a corpus-based approach, the method comprising:

capturing, by a processor of a computing system, social media outputs from a user and from cohorts of the user to create a user corpora and a user cohort corpora, respectively;

storing, by the processor, the user corpora and the user cohort corpora in a computer readable storage device coupled to the computing system;

deriving, by the processor, a hashtag collation model by analyzing the user corpora and the user cohort corpora stored on the computer readable storage device, the hashtag collation model being stored on the computer readable storage device;

generating, by the processor, a best matched hashtag using the hashtag collation model, wherein the hashtag collation model infers the best matched hashtag from the user corpora and user cohort corpora based on a usage of one or more terms within the user corpora and the user cohort corpora; and adjusting, by the processor, the best matched hashtag over time as the user corpora and the user cohort corpora change over time, wherein the adjusting includes distinguishing static terms of the best matched hashtag from dynamic terms of the optimal hashtag, wherein the static terms of the best matched hashtag remain locked over time and the dynamic terms of the best matched hashtag are adjusted over time to maintain a degree of relevancy of the best matched hashtag.

2. The method of claim 1, restricting, by the processor, a number of the cohorts of the user by applying a filter to the social media outputs of the cohorts of the user.

3. The method of claim 2, wherein the filter is a geofence, such that only social media outputs from cohorts of the user within the geofence are used to create the user cohort corpora.

4. The method of claim 1, wherein analyzing the user corpora and the user cohort corpora includes a corpora linguistic analysis to collate and colligate data within the user corpora and the user cohort corpora.

5. The method of claim 1, wherein the adjusting incorporates newly trending terms from the user corpora and user cohort corpora.

6. The method of claim 1, further comprising: controlling, by the processor, a sentiment of the best matched hashtag by filtering out social media outputs from the user corpora and the user cohort corpora that do not match a preferred sentiment.

7. The method of claim 1, wherein the computer readable storage device is a server system, wherein the user corpora and the user cohort corpora is stored within a session state of the server system to increase a processing speed from the server system while using less memory.

8. The method of claim 1, wherein the computer readable storage device is a database that includes stores the optimal hashtag and adjusted hashtags, further wherein the timestamps of the optimal hashtag and the adjusted hashtags are mapped to a database table of the database to decrease retrieval times when retrieving data from the database.

9. A computing system, comprising:
a processor;
a memory device coupled to the processor; and
a computer readable storage device coupled to the processor, wherein the storage device contains program code executable by the processor via the memory device to implement a method for generating dynamic and non-subjective hashtags using a corpus-based approach, the method comprising:
capturing, by the processor, social media outputs from a user and from cohorts of the user to create a user corpora and a user cohort corpora, respectively;
storing, by the processor, the user corpora and the user cohort corpora in a computer readable storage device coupled to the computing system;
deriving, by the processor, a hashtag collation model by analyzing the user corpora and the user cohort corpora stored on the computer readable storage device, the hashtag collation model being stored on the computer readable storage device;
generating, by the processor, a best matched hashtag using the hashtag collation model, wherein the hashtag collation model infers the optimal hashtag from the user corpora and user cohort corpora based on a usage of one or more terms within the user corpora and the user cohort corpora; and
adjusting, by the processor, the best matched hashtag over time as the user corpora and the user cohort corpora change over time, wherein the adjusting includes distinguishing static terms of the best matched hashtag from dynamic terms of the optimal hashtag, wherein the static terms of the best matched hashtag remain locked over time and the dynamic terms of the best matched hashtag are adjusted over time to maintain a degree of relevancy of the best matched hashtag.

10. The computing system of claim 9, restricting, by the processor, a number of the cohorts of the user by applying a filter to the social media outputs of the cohorts of the user, further wherein the filter is a geofence, such that only social media outputs from cohorts of the user within the geofence are used to create the user cohort corpora.

11. The computing system of claim 9, wherein analyzing the user corpora and the user cohort corpora includes a corpora linguistic analysis to collate and colligate data within the user corpora and the user cohort corpora.

12. The computing system of claim 9, further comprising: controlling, by the processor, a sentiment of the best matched hashtag by filtering out social media outputs from the user corpora and the user cohort corpora that do not match a preferred sentiment.

13. The computing system of claim 9, wherein the computer readable storage device is a server system, wherein the user corpora and the user cohort corpora is stored within a session state of the server system to increase a processing speed from the server system while using less memory.

14. The computing system of claim 9, wherein the computer readable storage device is a database that includes stores the best matched hashtag and adjusted hashtags, further wherein the timestamps of the best matched hashtag and the adjusted hashtags are mapped to a database table of the database to decrease retrieval times when retrieving data from the database.

15. A computer program product, comprising a computer readable hardware storage device storing a computer readable program code, the computer readable program code comprising an algorithm that when executed by a computer processor of a computing system implements a method for generating dynamic and non-subjective hashtags using a corpus-based approach, the method comprising:
capturing, by the processor, social media outputs from a user and from cohorts of the user to create a user corpora and a user cohort corpora, respectively;
storing, by the processor, the user corpora and the user cohort corpora in a computer readable storage device coupled to the computing system;
deriving, by the processor, a hashtag collation model by analyzing the user corpora and the user cohort corpora stored on the computer readable storage device, the hashtag collation model being stored on the computer readable storage device;
generating, by the processor, a best matched hashtag using the hashtag collation model, wherein the hashtag collation model infers the optimal hashtag from the user corpora and user cohort corpora based on a usage of one or more terms within the user corpora and the user cohort corpora; and
adjusting, by the processor, the best matched hashtag over time as the user corpora and the user cohort corpora change over time, wherein the adjusting includes distinguishing static terms of the best matched hashtag from dynamic terms of the optimal hashtag, wherein the static terms of the best matched hashtag remain locked over time and the dynamic terms of the best matched hashtag are adjusted over time to maintain a degree of relevancy of the best matched hashtag.

16. The computer program product of claim 15, restricting, by the processor, a number of the cohorts of the user by applying a filter to the social media outputs of the cohorts of the user, further wherein the filter is a geofence, such that only social media outputs from cohorts of the user within the geofence are used to create the user cohort corpora.

17. The computer program product of claim 15, further comprising: controlling, by the processor, a sentiment of the best matched hashtag by filtering out social media outputs from the user corpora and the user cohort corpora that do not match a preferred sentiment.

* * * * *